(12) United States Patent
Tonini et al.

(10) Patent No.: US 11,834,118 B2
(45) Date of Patent: Dec. 5, 2023

(54) STEERING PIN AND KNUCKLE ASSEMBLY

(71) Applicant: DANA ITALIA S.R.L., Trentino (IT)

(72) Inventors: Daniele Tonini, Arco (IT); Federico Bavaresco, Arco (IT)

(73) Assignee: DANA ITALIA S.R.L., Arco (IT)

( * ) Notice: Subject to any disclaimer, the term of this patent is extended or adjusted under 35 U.S.C. 154(b) by 0 days.

(21) Appl. No.: 17/645,015

(22) Filed: Dec. 17, 2021

(65) Prior Publication Data
US 2022/0194466 A1    Jun. 23, 2022

(30) Foreign Application Priority Data
Dec. 18, 2020   (DE) .................... 20 2020 107 400.8

(51) Int. Cl.
   *B62D 7/18*       (2006.01)
   *B62D 15/02*      (2006.01)
   *B60G 7/02*       (2006.01)

(52) U.S. Cl.
   CPC ............. *B62D 7/18* (2013.01); *B60G 7/02* (2013.01); *B62D 15/021* (2013.01); *B60G 2206/50* (2013.01)

(58) Field of Classification Search
   CPC . B62D 7/18; B62D 7/16; B62D 7/163; B62D 7/166; B62D 15/02; B62D 15/021; B60G 2206/50; B60G 7/02; B60G 2200/44
   USPC ................... 280/93.512, 93.51, 93.511
   See application file for complete search history.

(56) References Cited

U.S. PATENT DOCUMENTS

| | | | |
|---|---|---|---|
| 2005/0110235 A1* | 5/2005 | LeBlanc ............... | B60G 11/28 280/124.135 |
| 2007/0001416 A1* | 1/2007 | Freytag ................ | B60G 3/24 280/93.512 |
| 2008/0084042 A1* | 4/2008 | Dinakaran .......... | B60G 7/008 280/93.512 |
| 2016/0355065 A1* | 12/2016 | Graeuler ............. | B60G 3/202 |

FOREIGN PATENT DOCUMENTS

EP           1726512 A1    11/2006

* cited by examiner

*Primary Examiner* — Keith J Frisby
(74) *Attorney, Agent, or Firm* — McCoy Russell LLP

(57) ABSTRACT

Methods and systems are provided for a steering pin and knuckle assembly. In one example, the assembly comprises a steering knuckle comprising a recess and a female threaded portion, a steering pin partially received in the recess, a connection member comprising a male threaded portion, and the male threaded portion of the connection member is engaged with the female threaded portion of the steering knuckle and the connection member fixes the steering pin on the steering knuckle.

19 Claims, 3 Drawing Sheets

STEERING PIN AND KNUCKLE ASSEMBLY

CROSS-REFERENCE TO RELATED APPLICATION

The present application claims priority to German Utility Model Application No. 20 2020 107 400.8, entitled "STEERING PIN AND KNUCKLE ASSEMBLY", and filed on Dec. 18, 2020. The entire contents of the above-listed application is hereby incorporated by reference for all purposes.

TECHNICAL FIELD

The present document relates to a steering pin and knuckle assembly and to a steered suspension system including said steering pin and knuckle assembly. Steering pin and knuckle assemblies and steered suspension systems may be used in automobiles, for instance in off-highway vehicles, for example in agricultural vehicles such as tractors or harvesters, or in working machines such as wheeled loaders, wheeled excavators, or the like.

BACKGROUND AND SUMMARY

Steering pin and knuckle assemblies may include a steering pin mounted on a steering knuckle, for example via connection members such as screws, bolts, or screw nuts. The steering pin may rotatably connect the steering knuckle to an axle member or to a suspension control arm or wishbone of a vehicle and is rotatably received in a female joint portion mounted on the axle member or on the suspension control arm or wishbone. The steering knuckle supports or is configured to support a vehicle wheel that is or may be mounted on the steering knuckle.

For example, EP1726512B1 relates to a utility vehicle, for instance, the utility vehicle is an agricultural tractor with a steering system having single-wheel-suspended steering wheels, which are mounted on a respective wheel carrier. Each wheel carrier may be swivelled about the axis of at least one rigidly connected bolt and is connected via a ball-and-socket joint on the at least one bolt, to a transverse steering element that is articulated to the vehicle body. Associated with the ball-and-socket joint is a steering angle sensor comprising a rotatable input member, which is located at least approximately in the extension of the axis of the swivel bolt. The rotatable input member is connected to the bolt via an entrainment element that transmits the swivel motion of the bolt in an angularly precise manner to detect the current swivel position of the wheel carrier.

However, there is demand for a steering pin and knuckle assembly that may be assembled quickly and easily and that may provide a stable connection between steering pin and knuckle.

This object is at least partially solved by a steering pin and knuckle assembly including a steering knuckle including a recess and a female threaded portion, a steering pin partially received in the recess, and a connection member comprising a male threaded portion, wherein the male threaded portion of the connection member is engaged with the female threaded portion of the steering knuckle and the connection member fixes the steering pin on the steering knuckle.

Due to the male threaded portion of the connection member is engaged with the female threaded portion of the steering knuckle and the connection member fixes the steering pin on the steering knuckle, the proposed assembly can be assembled quickly, safely and with ease.

The steering pin and the connection member may be configured as separate members.

A symmetry axis of the steering pin may be coaxial with a symmetry axis of the female threaded portion of the steering knuckle.

The connection member may be partially disposed in and protrude out of a hollow formed in the steering pin. The female threaded portion of the steering knuckle may define an axial direction. The hollow formed in the steering pin may extend all the way through the steering pin along the axial direction.

The hollow and the connection member may be shaped such that in order to access the steering pin on the steering knuckle via the connection member, the connection member is insertable into the hollow formed in the steering pin from an axial end of the steering pin protruding out of the recess formed in the steering knuckle.

An axial end portion of the connection member disposed within the hollow formed in the steering pin may comprise an engagement structure configured for engagement with a tool for fastening the connection member, such as for engagement with a screw driver, an Allan key, or the like.

An axial end portion of the connection member may comprise the male threaded portion and may protrude out of the hollow formed in the steering pin. Said axial end portion of the connection member may be fully received within the steering knuckle and so that it does not protrude out of the steering knuckle.

The connection member may include an increased diameter portion locking the steering pin to the steering knuckle in a tight fit. The increased diameter portion of the connection member may be received in a seat formed by a shoulder portion of the steering pin enclosing the hollow formed in the steering pin.

The recess formed in the steering knuckle may comprise a female tapered or a female conical portion. The steering pin on its part may then comprise a male tapered or conical portion received in the female tapered or female conical portion of the recess. An inner diameter of the female threaded portion of the steering knuckle may be smaller than a smallest diameter of the female tapered or female conical portion of the recess.

A portion of the steering pin protruding out of the recess formed in the steering knuckle may comprise a male spherical joint portion.

A presently proposed steered suspension system may include the above-described steering pin and knuckle assembly, wherein a portion of the steering pin protruding out of the recess formed in the steering knuckle comprises the previously described male spherical joint portion, and a suspension control arm including a female spherical joint portion, wherein the male spherical joint portion of the steering pin is received in the female spherical joint portion of the suspension control arm to form a spherical joint between the steering pin and the suspension control arm.

The steered suspension system may further comprise a steering rod rotatably connected to the steering knuckle.

The steered suspension system may further comprise a vehicle wheel mounted on the steering knuckle, a drive shaft for driving the vehicle wheel, and a cardan joint connecting the vehicle wheel and the drive shaft.

The steered suspension system may further comprise a steering sensor. The steering sensor may comprise a fixed sensor portion mounted on the suspension control arm and a movable sensor portion mounted on the connection member. The movable sensor portion may be mounted on the connection member by means of a double cardan shaft.

BRIEF DESCRIPTION OF THE FIGURES

Embodiments of the presently proposed steering pin and knuckle assembly and of the presently proposed steered suspension system are described in the following detailed description and are depicted in the accompanying drawings.

FIGS. 1-3 are shown approximately to scale.

DETAILED DESCRIPTION

Figure 1:
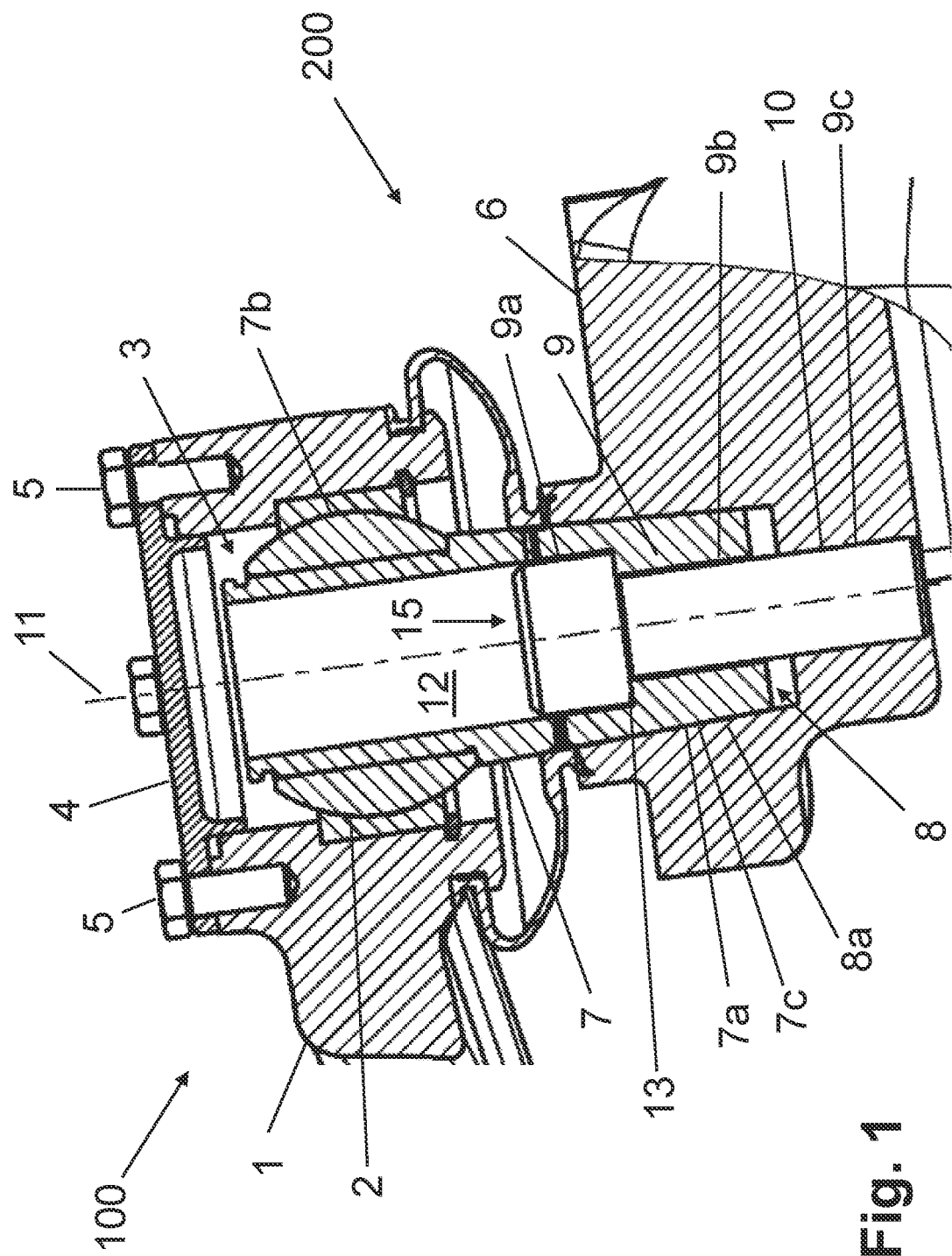
FIG. 1 schematically illustrates a sectional view of a steered suspension system including a steering pin and knuckle assembly of the presently proposed type according to a first embodiment.

FIG. 1 depicts a steered suspension system 100. The steered suspension system 100 may include a suspension control arm 1 that may be pivotally connected to a stationary portion of a vehicle. The vehicle may be a tractor. However, it is understood that the vehicle may be of another type. For example, the vehicle may also be a harvester, a wheel loader, a dumper, or any other type of vehicle. The stationary portion may be a vehicle body or chassis, for example. The system 100 further includes a female spherical joint portion 2 which is fixedly mounted in a recess or bore 3 formed in the suspension control arm 1. The recess or bore 3 extends all the way through the suspension control arm 1. However, a plate 4 is mounted on the suspension control arm via screws 5 and closes the recess or bore 3 on one end thereof, for example in order to prevent dirt or dust from entering the recess or bore.

The steered suspension system 100 further includes a steering and knuckle assembly 200. The steering and knuckle assembly 200 comprises a steering knuckle 6, a steering pin 7 partially received in a recess 8 formed in the steering knuckle 6 and partially protruding out of the recess 8, and a threaded connection member 9 fixing or fixedly connecting the steering pin 7 on the steering knuckle 6. Typically, the steering knuckle 6 and/or the steering pin 7 and/or the connection member 9 may include a metal such as steel. However, it is understood that they may include other materials, such as aluminum, cast iron, carbon fiber, magnesium, combinations thereof, and/or other alloys. The steering pin 7 includes an elongate shaft portion 7a and a male spherical joint portion 7b. One portion of the elongate shaft portion 7a is received in the recess 8 formed in the steering knuckle 6, and another portion of the elongage shaft portion 7a protrudes out of the recess 8 formed in the steering knuckle 6. The male spherical joint portion 7a is fixedly mounted on the portion of the elongate shaft portion 7a that protrudes out of the recess 8. In the embodiment depicted here, the two steering pin portions 7a, 7b are configured as separate members that are fixedly connected to one another. In other embodiments not explicitly depicted here, the two portions 7a, 7b may possibly be formed in one piece. The male spherical joint portion 7a of the steering pin 7 is received in the female spherical joint portion 2 mounted in the recess or bore 3 of the suspension control arm 1. The portions 2 and 7a form a spherical joint between the steering and knuckle assembly 200 and the suspension control arm 1 of the steered suspension system 100.

The steering knuckle 6 further includes a female threaded portion 10. The female threaded portion 10 and the recess 8 are symmetrical with respect to an axis 11 defining an axial direction. The female threaded portion 10 extends from the recess 8 along the axial direction and is in communication with the recess 8. In the embodiment depicted here, the steering pin 7 and the connection member 9, too, are symmetrical with respect to the axis 11. Both the elongage shaft portion 7a and the male spherical joint portion 7b of the steering pin 7 may be symmetrical with respect to the axis 11.

The steering pin 7, more specifically the elongage shaft portion 7a of the steering pin 7, includes or encloses a hollow 12. The hollow 12 extends all the way through the steering pin 7 or through the elongate portion 7a of the steering pin 7 along the axial direction 11. A portion of the elongage shaft portion 7a of the steering pin 7 enclosing the hollow 12 forms a shoulder portion 13. At the shoulder portion 13, an inner diameter of the hollow 12 perpendicular to the axial direction 11 may feature a step-like discontinuity, for example.

The connection member 9 has an elongate shape or form. One portion of the connection member 9 is disposed or received in the hollow 12 of or enclosed by the steering pin 7. Or in other words, one portion of the connection member 9 is disposed or received in the hollow steering pin 7. Another portion of the connection member 9 protrudes out of the hollow 12 or out of the steering pin 7 and is received in the female threaded portion 10 extending from the recess 8 formed in the steering knuckle 6. More specifically, the connection member 9 has an increased diameter portion 9a and a decreased diameter portion 9b. A diameter of the increased diameter portion 9a of the connection member 9 perpendicular to the axial direction 11 is greater than a diameter of the decreased diameter portion 9b of the connection member 9 perpendicular to the axial direction 11. The portions 9a, 9b of the connection member 9 may be formed in one piece.

The shoulder portion 13 of the steering pin 7 or of the elongate shaft portion 7a of the steering pin 7 forms a seat for the increased diameter portion 9a of the connection member 9. Or in other words, the increased diameter portion 9a of the connection member 9 is received in a seat formed by the shoulder portion 13 of the steering pin 7 or of the elongate shaft portion 7a of the steering pin 7. The increased diameter portion 9a of the connection member 9 is disposed or received within the hollow 12 or within the steering pin 7. The decreased diameter portion 9b extends from the increased diameter portion 9a along the axial direction 11.

A portion of the decreased diameter portion 9b protrudes out of the hollow 12 or out of the steering pin 7 and has a male threaded portion 9c formed on its outer surface. The male threaded portion 9c of the connection member 9 or of the decreased diameter portion 9b of the connection member 9 protrudes into or is received in and engaged with the female threaded portion 10 formed in the steering knuckle 6. For example, in a direction along the axial direction 11 pointing away from the steering pin 7 the male threaded portion 9c of the connection member 9 may not protrude out of the female threaded portion 10 of the steering knuckle 6.

The steering pin 7 is fixed or attached to the steering knuckle 6 by screwing the male threaded portion 9c of the connection member 9 into the female threaded portion 10 formed in the steering knuckle 6. More specifically, the male threaded portion 9c of the connection member 9 is screwed into and/or engaged with the female threaded portion 10 formed in the steering knuckle 6 in such a way that the increased diameter portion 9a of the connection member 9 locks the steering pin 7 to or presses the steering pin 7 against the steering knuckle 6 in a tight fit. In the embodiment of the steering pin and knuckle assembly 200 depicted here, the recess 8 formed in the steering knuckle 6 has a female tapered or female conical portion 8a. Further, a portion of the steering pin 7 or of the elongate shaft portion 7a of the steering pin 7 received in the recess 8 has a correspondingly shaped male tapered or male conical portion 7c which is received in the female tapered or female conical portion 8a of the recess 8. The correspondingly shaped male and female tapered or conical portions 7c and 8a of the steering pin 7 and of the recess 8, respectively, may facilitate tight-fitting the steering pin 7 to or against the steering knuckle 6. Here, an inner diameter of the female threaded portion 10 extending from the recess 8 in the axial direction 11 is smaller than a minimum inner diameter of the recess 8 or of the female tapered or female conical portion 8a of the recess 8.

In the embodiment of the steering pin and knuckle assembly 200 depicted here, the hollow 12 and the connection member 9 are shaped or designed such that in order to screw the connection member 9 into the female threaded portion 10 of the steering knuckle 6 the connection member 9 may be inserted into the hollow 12 extending through the steering pin 7 from an axial end of the steering pin 7 that protrudes out of the recess 8 formed in the steering knuckle 6. For example, in an axial section of the hollow 12 extending from the shoulder portion 13 to the axial end of the steering pin 7 protruding out of the recess 8, a minimum diameter of the hollow 12 perpendicular to the axis 11 may be greater than a maximum diameter of the increased diameter portion 9a of the connection member 9. In this way, the connection member 9 may be inserted into the hollow 12 from the axial end of the steering pin 7 that protrudes out of the recess 8 until the increased diameter portion 9a of the connection member 9 abuts the seat formed by the shoulder portion 13 of the steering pin 7.

In order to facilitate the process of screwing the connection member 9 into the female threaded portion 10 formed in the steering knuckle 6, an axial end portion of the connection member received within the hollow 12 may comprise an engagement structure 15 for engagement with a tool for fastening the connection member 9 to the steering knuckle 6 or for screwing the connection member 9 into the female threaded portion 10 formed in the steering knuckle 6. For example, the engagement structure 15 may include a cross slot, a female hexagonal recess, or the like.

Figure 2:
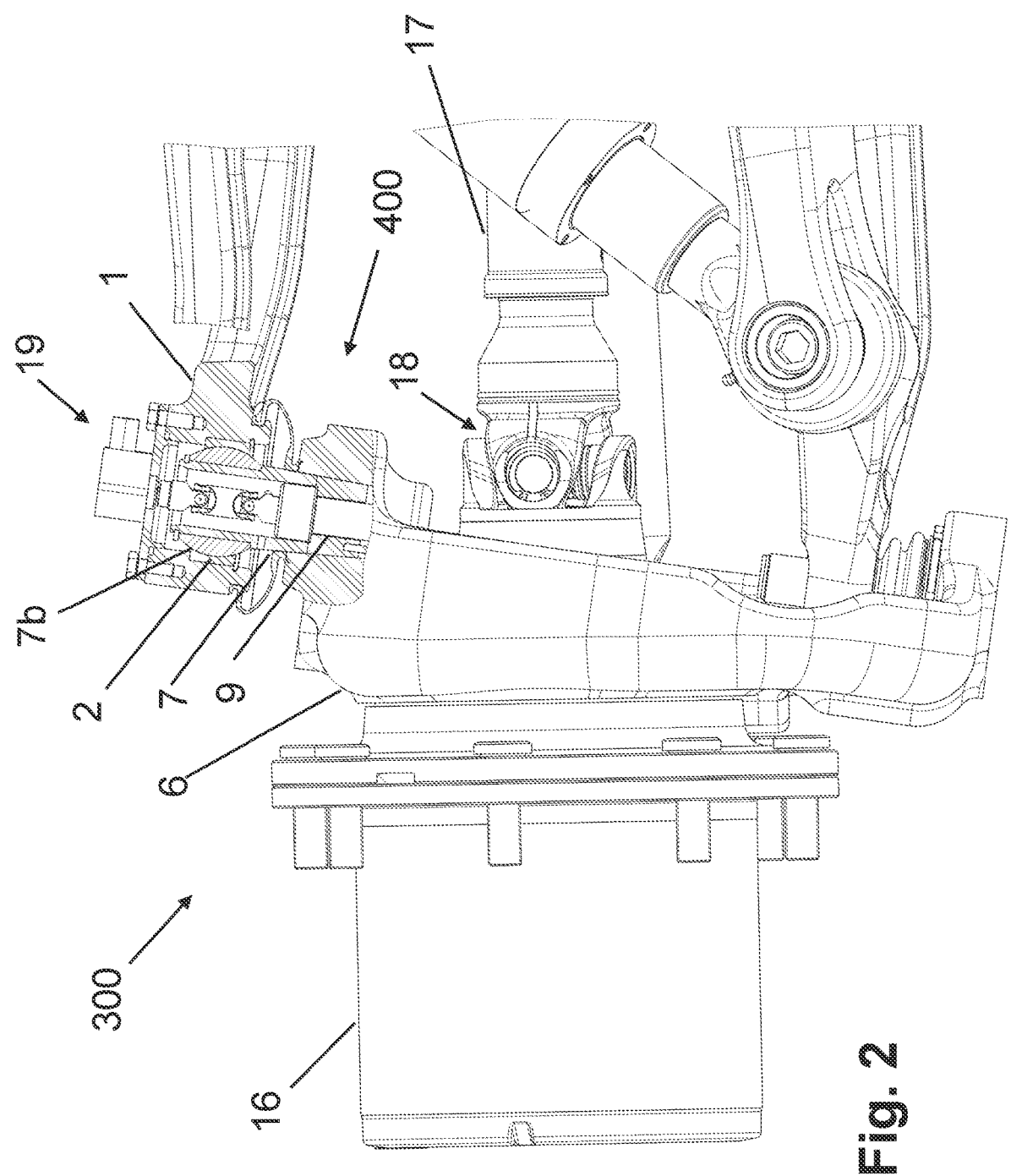
FIG. 2 schematically illustrates a sectional view of a steered suspension system including a steering pin and knuckle assembly of the presently proposed type according to a second embodiment.
Figure 3:
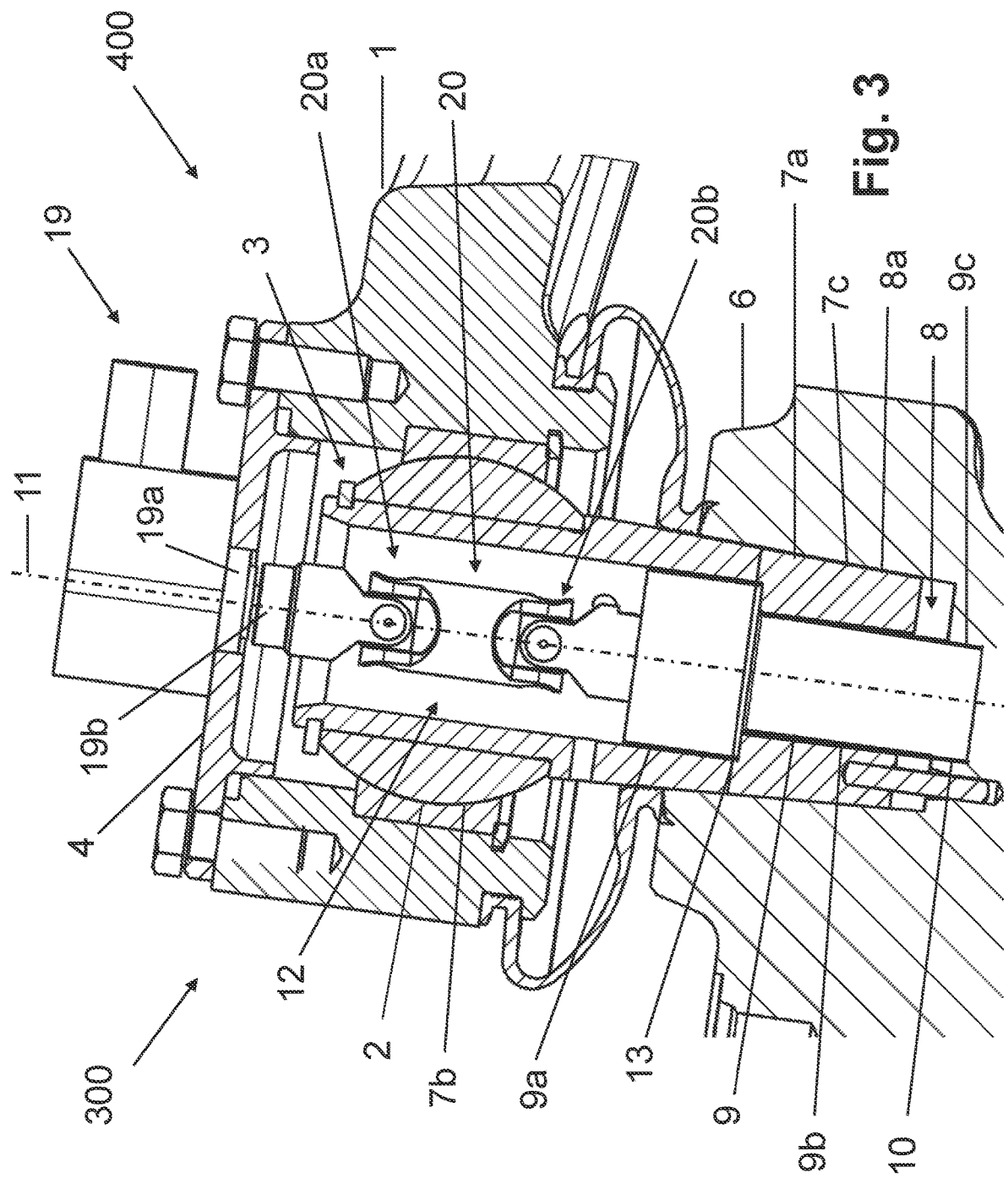
FIG. 3 schematically illustrates a detail of FIG. 2.

FIG. 2 shows a sectional view of a steered suspension system 300 according to a second embodiment. Here and in all of the following, recurring features in different figures are designated with the same reference signs. The steered suspension system 300 of FIG. 2 includes the suspension control arm 1 with the female spherical joint portion 2 mounted thereon, and a steering pin and knuckle assembly 400 which is a variation of the steering pin and knuckle assembly 200 depicted in FIG. 1. Details of the steering pin and knuckle assembly 400 of FIG. 2 are shown in FIG. 3. The steering pin and knuckle assembly 400 of FIGS. 2 and 3 includes all features of the steering pin and knuckle assembly 200 of FIG. 1, except for the engagement structure 15 indicated in FIG. 1 and discussed above. For simplicity, in the following only the differences between the steering pin and knuckle assembly 400 of FIGS. 2 and 3 and the steering pin and knuckle assembly 200 of FIG. 1 are discussed in some detail.

In the system 300 of FIGS. 2 and 3, the female spherical joint portion 2 and the male spherical joining portion 7b of the steering pin 7 form a spherical joint between the suspension control arm 1 and the steering pin and knuckle assembly 400. The system 300 further includes a vehicle wheel 16 rotatably mounted on the steering knuckle 6, and a drive shaft 17 connected to the vehicle wheel 16 via a cardan joint 18 for driving the vehicle wheel 16. The system 300 may further include a steering rod (not shown) pivotably connected to the steering knuckle 6 for steering the steering knuckle 6.

As can best be seen in FIG. 3, the system 300 further comprises a steering sensor 19. The steering sensor 19 is configured to measure a steering angle or a variation of a steering angle between the steering knuckle 6 and the suspension control arm 1. The steering sensor 19 includes a fixed sensor portion 19a and a movable sensor portion 19b which is movable or rotatable with respect to the fixed sensor portion 19a, for instance with respect to a steering axis which may be aligned with or which may substantially be aligned with the symmetry axis 11 of the steering pin 7. The fixed sensor portion 19a is fixedly mounted on the suspension control arm 1, more specifically on the plate 4 closing or capping the recess or bore 3 extending through the control arm 1. The movable sensor portion 19b on the other hand is fixedly mounted on the steering knuckle 6, for instance on the connection member 9. Here, the movable sensor portion 19b is mounted on the connection member 9 via a double cardan shaft 20 including two cardan joints 20a and 20b. The double cardan shaft 20 is at least partially disposed within the hollow 12 formed within the steering pin 7. However, it is understood that the movable sensor portion 19b may be mounted on the steering knuckle 6 by other elements.

The sensor portions 19a, 19b are configured and arranged such that rotation of the movable sensor portion 19b relative to the fixed sensor portion 19a changes a voltage in the fixed sensor portion 19a wherein the voltage is indicative of a rotation angle of the steering knuckle 6 relative to the suspension control arm 1 or of a change in the rotation angle. For example, the steering sensor 19 may be an inductive sensor. For instance, the fixed sensor portion 19a may include an inductive element such as a coil, and the movable sensor portion 19b may include a magnet. However, it is understood that the steering sensor 19 is not limited to inductive sensors but may include other types of sensors known in the art.

FIGS. 1-3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another.

As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

The invention claimed is:

1. An assembly, comprising:
a steering knuckle comprising a recess and a female threaded portion;
a control arm comprising a female joint portion;
a steering pin comprising an exterior male joint portion and an interior hollow forming a shoulder, a lower portion of the steering pin received in the recess of the steering knuckle and the male joint portion of the steering pin received in the female joint portion of the control arm; and
a connection member comprising a male threaded portion which engages the female threaded portion of the steering knuckle, the connection member comprising an increased diameter portion which engages with the shoulder within the hollow, and the engagement of the male threaded portion to the female threaded portion, the increased diameter portion to the shoulder, and the male joint portion to the female joint portion fixing the connection member to the steering knuckle, the connection member to the steering pin, and the steering pin to the control arm.

2. The assembly of claim 1, wherein the steering pin and the connection member are configured as separate members.

3. The assembly of claim 1, wherein a symmetry axis of the steering pin is coaxial with a symmetry axis of the female threaded portion of the steering knuckle.

4. The assembly of claim 1, wherein the female threaded portion of the steering knuckle defines an axial direction and an axial end portion of the connection member comprising the male threaded portion and protruding out of the hollow formed in the steering pin is fully received within the steering knuckle and does not protrude out of the steering knuckle.

5. The assembly of claim 1, wherein the female threaded portion of the steering knuckle defines an axial direction and the hollow formed in the steering pin extends entirely through the steering pin along the axial direction.

6. The assembly of claim 5, wherein the connection member is insertable into the hollow formed in the steering pin from an axial end of the steering pin protruding out of the recess formed in the steering knuckle, and the connection member fixes the steering pin on the steering knuckle.

7. The assembly of claim 1, wherein the increased diameter portion engages with the shoulder of the steering pin which presses the steering pin towards the female threaded portion to lock the steering pin to the steering knuckle in a tight fit.

8. The assembly of claim 1, wherein the recess formed in the steering knuckle comprises a female tapered or conical portion.

9. The assembly of claim 8, wherein an inner diameter of the female threaded portion of the steering knuckle is smaller than a smallest diameter of the female tapered or conical portion of the recess.

10. The assembly of claim 1, wherein the connection member terminates in a lower portion of the hollow of the steering pin, a mount connects to the terminal end of the connection member, a movable portion of a steering sensor attaches to the mount, and the movable portion of the steering sensor extends out of the hollow.

11. The assembly of claim 10, wherein the movable portion of the steering sensor interacts with a fixed portion of the steering sensor fixedly attached to the control arm.

12. A steered suspension system, comprising:
a steering knuckle comprising a recess and a female threaded portion;
a steering pin partially received in the recess;
a connection member comprising a male threaded portion;
wherein the male threaded portion of the connection member is engaged with the female threaded portion of the steering knuckle and the connection member fixes the steering pin on the steering knuckle, and a portion of the steering pin protruding out of the recess formed in the steering knuckle comprises a male spherical joint portion; and
a suspension control arm including a female spherical joint portion and the male spherical joint portion of the steering pin is received in the female spherical joint portion of the suspension control arm to form a spherical joint between the steering pin and the suspension control arm;
wherein the engagement of the male threaded portion to the female threaded portion, engagement of an increased diameter portion of the connection member to a shoulder of the steering pin, and the receiving of the male spherical joint portion in the female spherical joint portion lock the control arm, the steering knuckle, the steering pin, and the connection member together.

13. The steered suspension system of claim 12, further comprising:
a vehicle wheel mounted on the steering knuckle,
a drive shaft for driving the vehicle wheel, and
a cardan joint connecting the vehicle wheel and the drive shaft.

14. The steered suspension system of claim 12, further comprising a steering sensor, the steering sensor comprising a fixed sensor portion mounted on the suspension control arm and a movable sensor portion mounted on the connection member within a hollow formed by the steering pin, the movable sensor portion extending from the connection member out of the hollow of the steering pin to interact with the fixed sensor portion mounted on the suspension control arm.

15. The steered suspension system of claim 14, wherein the movable sensor portion is mounted on the connection member via a double cardan shaft.

16. The system of claim 12, wherein the shoulder is formed by an interior hollow of the steering pin and the shoulder engages the increased diameter portion when the male threaded portion engages with the female threaded portion to press the steering pin towards the steering knuckle.

17. An assembly, comprising:
a control arm comprising a female joint portion;
a steering knuckle comprising a recess, a female tapered or conical portion, and a female threaded portion;

a steering pin comprising an exterior male joint portion and an interior hollow forming a shoulder, a lower portion of the steering pin partially received in the recess of the steering knuckle and the male joint portion of the steering pin received in the female joint portion of the control arm; and a connection member comprising a male threaded portion which engages with the female threaded portion of the steering knuckle, and the connection member comprising an increased diameter portion which engages with the shoulder within the hollow of the steering pin to urge the steering pin towards the steering knuckle and lock the steering pin to the steering knuckle in a tight fit, and the connection member fixing the steering pin on the steering knuckle.

18. The assembly of claim 17, wherein the steering pin comprises a male tapered or conical portion received in the female tapered or conical portion, and wherein an inner diameter of the female threaded portion of the steering knuckle is smaller than a smallest diameter of the female tapered or conical portion.

19. The assembly of claim 17, wherein the connection member terminates in a lower portion of the hollow of the steering pin, a mount connects to the terminal end of the connection member, a movable portion of a steering sensor attaches to the mount, and the movable portion of the steering sensor extends out of the hollow to interact with a fixed portion of the steering sensor fixedly attached to the control arm.

* * * * *